(12) United States Patent
Zhang (10) Patent No.: US 12,207,039 B2
(45) Date of Patent: Jan. 21, 2025

(54) DEVICE FOR EXPANSION AND CONTRACTION THROUGH ROTATION OF ROTARY SHAFT AND VR HEADSET

(71) Applicant: Shenzhen KIWI Design Co., Ltd., Guangdong (CN)

(72) Inventor: Zhinan Zhang, Guangdong (CN)

(73) Assignee: Shenzhen KIWI Design Co., Ltd., Shenzhen (CN)

( * ) Notice: Subject to any disclaimer, the term of this patent is extended or adjusted under 35 U.S.C. 154(b) by 218 days.

(21) Appl. No.: 18/096,026

(22) Filed: Jan. 12, 2023

(65) Prior Publication Data

US 2023/0308800 A1    Sep. 28, 2023

(30) Foreign Application Priority Data

Mar. 28, 2022   (CN) .......................... 202220695484.6

(51) Int. Cl.
*H04R 1/10* (2006.01)
*F16H 25/16* (2006.01)

(52) U.S. Cl.
CPC ........... *H04R 1/1066* (2013.01); *F16H 25/16* (2013.01); *H04R 1/1008* (2013.01); *H04R 1/105* (2013.01); *H04R 1/1075* (2013.01); *H04R 2499/15* (2013.01)

(58) Field of Classification Search
CPC .... H04R 1/1066; H04R 1/1008; H04R 1/105; H04R 1/1075; H04R 2499/15; F16H 25/16
USPC ......................................................... 381/376
See application file for complete search history.

(56) References Cited

U.S. PATENT DOCUMENTS

| 11,700,477 | B2* | 7/2023 | Li ........................ H04R 9/025 |
| | | | 381/386 |
| 12,105,357 | B2* | 10/2024 | Wang .................... H04R 5/0335 |
| 2016/0249124 | A1* | 8/2016 | Drinkwater ............ H04R 1/105 |
| 2016/0366506 | A1* | 12/2016 | Kim ....................... H04R 1/105 |
| 2019/0045295 | A1* | 2/2019 | Kim ....................... H04R 1/1033 |
| 2021/0051390 | A1* | 2/2021 | He ........................ H04R 1/1066 |
| 2022/0201391 | A1* | 6/2022 | Jo ............................ H04R 1/02 |
| 2023/0011002 | A1* | 1/2023 | Fernandez Hermida .................... |
| | | | G06T 7/70 |

FOREIGN PATENT DOCUMENTS

WO    WO-2020038487 A1 *   2/2020   ............. G02C 11/06

* cited by examiner

*Primary Examiner* — Sean H Nguyen (57) ABSTRACT

Disclosed are a device for expansion and contraction through rotation of a rotary shaft and a VR headset. The device includes a first connecting housing, a second connecting housing, a third connecting housing, a connecting member and a positioning member. One end of the second connecting housing is rotatably connected to one end of the first connecting housing, and the third connecting housing is provided with a second inclined surface configured to fit a first inclined surface of the second connecting housing. The connecting member is configured to fix the first connecting housing, the second connecting housing, and the third connecting housing. The positioning member is configured to control the second connecting housing and the third connecting housing to avoid deviation when the second connecting housing and the third connecting housing rotate relative to each other. The present application effectively improves the operating comfort for the user.

14 Claims, 6 Drawing Sheets

DEVICE FOR EXPANSION AND CONTRACTION THROUGH ROTATION OF ROTARY SHAFT AND VR HEADSET

CROSS REFERENCE TO RELATED APPLICATIONS

The present application claims the benefit of Chinese Patent Application No. 202220695484.6 filed on Mar. 28, 2022, the contents of which are incorporated herein by reference in their entirety.

TECHNICAL FIELD

The present application relates to the field of connecting structures, and in particular, to a device for expansion and contraction through rotation of a rotary shaft and a VR headset.

BACKGROUND

Currently, with the development of science and technology, increasingly intelligent electronic products are popular, in which VR glasses and earphones are designed as a whole, which is called VR headset. In this way, a user may listen to a video with the built-in earphones when watching the video through the VR headset, without a need to use an additional external device.

However, during actual use, after watching the video, the user first needs to open the earphones with hands, that is, release the earphones from tight attachment to ears, and then unfasten a fixing device behind a head to remove the VR headset. It can be learned that it is troublesome to manually open the earphones, which reduces the experience comfort of the VR headset.

SUMMARY

The present application is intended to provide a device for expansion and contraction through rotation of a rotary shaft and a VR headset, to solve a problem that the existing VR headset requires manual opening of earphones and thereby reduces the experience comfort of the VR headset.

To resolve the technical problem, an objective of the present application is implemented by the following technical solutions: providing a device for expansion and contraction through rotation of a rotary shaft, including:
  a first connecting housing;
  a second connecting housing, where one end of the second connecting housing is rotatably connected to one end of the first connecting housing, and a surface of the second connecting housing facing away from the first connecting housing is a first inclined surface;
  a third connecting housing, where the third connecting housing is provided with a second inclined surface configured to fit the first inclined surface;
  a connecting member, successively extending through the third connecting housing and the second connecting housing and connected to the first connecting housing, and configured to fix the first connecting housing, the second connecting housing, and the third connecting housing and fit the first inclined surface to the second inclined surface; and
  a positioning member, connected to the second connecting housing or the third connecting housing and configured to control the second connecting housing and the third connecting housing to avoid deviation when the second connecting housing and the third connecting housing rotate relative to each other, where
  a gap is defined between the connecting member and the second connecting housing.

Further, the connecting member includes a connecting post and a screw;
  the connecting post includes a post body and a protruding edge fixedly arranged on an end of the post body;
  a threaded hole is arranged on a tail end of the post body, the threaded hole extends in a length direction of the post body, and a gap is defined between the post body and the second connecting housing; and
  the screw is threadedly connected to the threaded hole, and is configured to press the protruding edge against an outer side of the third connecting housing after the post body successively extends through the third connecting housing, the second connecting housing, and the first connecting housing.

Further, the post body is a prism, the screw is connected to the first connecting housing through a square block, the square block is embedded in the first connecting housing, an end of the prism is embedded in the square block, and the screw extends through the square block and is threadedly connected to the end of the prism embedded in the square block.

Further, a buffer layer is arranged between the protruding edge and the third connecting housing.

Further, a plurality of limiting grooves are circumferentially arranged on the third connecting housing, the positioning member is a limiting block arranged on the second connecting housing and slidably connected to the limiting groove, a quantity of the limiting blocks corresponds to a quantity of the limiting grooves, and a circle center of each of the limiting grooves coincides with centers of rotation of the second connecting housing and the third connecting housing.

Embodiments of the present application further provide a VR headset, including two devices for expansion and contraction through rotation of a rotary shaft described above, a VR glass body, and two earphone bodies, where two ends of the VR glass body are respectively connected to other ends of the two first connecting housings and other ends of the two second connecting housings, and the two earphone bodies are respectively connected to the two third connecting housings.

Further, the earphone body includes an engagement member and a speaker, one end of the engagement member is rotatably connected to the third connecting housing through a rotary member, and an other end is fixedly connected to the speaker.

Further, a mounting block is arranged on the end of the engagement member, and the rotary member includes:
  a first engagement portion, fixedly arranged on an inner side wall of the third connecting housing;
  a second engagement portion, fixedly arranged on an outer peripheral side wall of the mounting block and configured to be engaged with the first engagement portion;
  a first wavy toothed section, arranged on a side of the third connecting housing facing the mounting block; and
  a second wavy toothed section, arranged on the mounting block.

Peak lines of the first wavy toothed section and the second wavy toothed section both extend outward along a center of rotation of the third connecting housing, and the first wavy toothed section is meshed with the second wavy toothed section when the first engagement portion is engaged with the second engagement portion.

Further, the second wavy toothed section is connected to the mounting block through an engagement block, and the engagement block is connected to the mounting block through a buffer block.

Further, a mounting groove is arranged on the mounting block, a reset torsion spring and a rotary shaft are arranged in the mounting groove, a rotation hole configured for the rotary shaft to extend through is arranged on the engagement member, the reset torsion spring is sleeved on the rotary shaft, and one end of the reset torsion spring is fixedly arranged on an inner wall of the mounting groove, and an other end is fixedly arranged on the engagement member, to reset the earphone body from an open state to an attached state.

Embodiments of the present application provide a device for expansion and contraction through rotation of a rotary shaft and a VR headset. The device for expansion and contraction through rotation of a rotary shaft includes the first connecting housing, the second connecting housing, the third connecting housing, the connecting member, and the positioning member. One end of the second connecting housing is rotatably connected to one end of the first connecting housing, and the surface of the second connecting housing facing away from the first connecting housing is the first inclined surface. The third connecting housing is provided with the second inclined surface configured to fit the first inclined surface. The connecting member successively extends through the third connecting housing and the second connecting housing and is connected to the first connecting housing, and is configured to fix the first connecting housing, the second connecting housing, and the third connecting housing, and fit the first inclined surface to the second inclined surface. The positioning member is connected to the second connecting housing or the third connecting housing, and is configured to control the second connecting housing and the third connecting housing to avoid deviation when the second connecting housing and the third connecting housing rotate relative to each other. The gap is defined between the connecting member and the second connecting housing.

In the embodiments, the first inclined surface and the second inclined surface are kept in the fitted state, so that the second connecting housing and the third connecting housing rotate relative to each other during rotation of the second connecting housing. Therefore, a lowest slope point of the second connecting housing approaches a lowest slope point of the third connecting housing, which causes the third connecting housing to expand. During resetting of the second connecting housing, the lowest slope point of the second connecting housing approaches a highest slope point of the third connecting housing, which causes the third connecting housing to contract. In this way, a user may expand and contract the third connecting housing through rotation of the second connecting housing, which effectively improves the operating comfort for the user.

BRIEF DESCRIPTION OF THE DRAWINGS

To describe the technical solutions in the embodiments of the present application more clearly, the following briefly introduces the accompanying drawings required for describing the embodiments. Apparently, the accompanying drawings in the following description show only some embodiments of the present application, and a person of ordinary skill in the art may still derive other drawings from these accompanying drawings without creative efforts.

Identification description in the figure:
1. First connecting housing; 2. Second connecting housing; 21. First inclined surface; 3. Third connecting housing; 31. Second inclined surface; 32. Receiving groove; 4. Connecting post; 41. Screw; 42. Post body; 43. Protruding edge; 44. Threaded hole; 45. Square block; 46. Buffer layer; 5. Limiting block; 51. Limiting groove; 6. VR glass body; 61. Earphone body; 62. Engagement member; 63. Speaker; 64. Rotation hole; 7. Mounting block; 71. First engagement portion; 72. Second engagement portion; 73. First wavy toothed section; 74. Second wavy toothed section; 75. Mounting groove; 8. Engagement block; 81. Buffer block; 9. Reset torsion spring; 91. Rotary shaft; 92. Engagement post; 93. Avoidance groove.

DETAILED DESCRIPTION

The following clearly and completely describes the technical solutions in the embodiments of the present application with reference to the accompanying drawings in the embodiments of the present application. Apparently, the described embodiments are some of the embodiments of the present application rather than all of the embodiments. Based on the embodiments of the present application, all other embodiments obtained by a person of ordinary skill in the art without creative efforts shall fall within the protection scope of the present application.

It should be understood that when used in this specification and the appended claims, the term "comprise" and "include" indicate the presence of described features, wholes, steps, operations, elements and/or components, but do not exclude the presence or addition of one or more other features, wholes, steps, operations, elements, components and/or a set thereof.

It should be understood that the terms used in the specification of the present application are merely used for describing specific embodiments, and are not intended to limit the present application. As used in the description of the present application and the appended claims, singular forms, "a" or "an" and "the", are intended to include plural forms, unless the context clearly indicates otherwise.

It should be further understood that a term "and/or" used in this specification of the present application and the appended claims refers to one or more of any and all possible combinations of the associated items that is listed and includes the combinations.

With reference to FIG. 1 to FIG. 5, embodiments of the present application provide a device for expansion and contraction through rotation of a rotary shaft, including:

a first connecting housing 1;

a second connecting housing 2, where one end of the second connecting housing 2 is rotatably connected to one end of the first connecting housing 1, and a surface of the second connecting housing 2 facing away from the first connecting housing 1 is a first inclined surface 21;

a third connecting housing 3, where a second inclined surface 31 configured to fit the first inclined surface 21 is arranged on the third connecting housing 3;

a connecting member, successively extending through the third connecting housing 3 and the second connecting housing 2 and connected to the first connecting housing 1, and configured to fix the first connecting housing 1, the second connecting housing 2, and the third connecting housing 3 and fit the first inclined surface 21 to the second inclined surface 31; and a positioning member, connected to the second connecting housing 2 or the third connecting housing 3 and configured to control the second connecting housing 2 and the third connecting housing 3 to avoid deviation when the second connecting housing and the third connecting housing rotate relative to each other, where a gap is defined between the connecting member and the second connecting housing 2.

Figure 3:
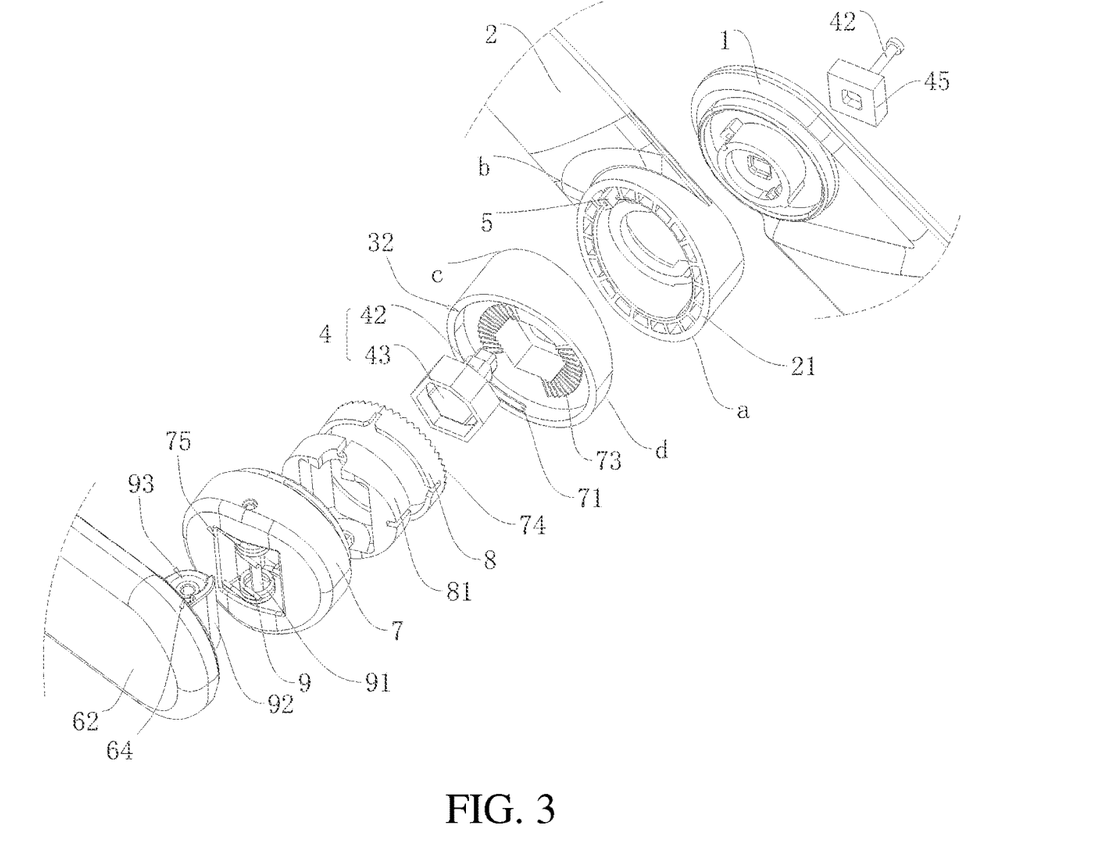
FIG. 3 is an exploded view of the device for expansion and contraction through rotation of a rotary shaft according to an embodiment of the present application.

In this embodiment, it should be noted that the first connecting housing 1 is configured to be connected to a VR glass body 6, the second connecting housing 2 extends to a back of a user's head to wear a VR headset on the user's head. The third connecting housing 3 is configured to be connected to an earphone body 61. For ease of description, according to a thickness of the second connecting housing 2, a highest point of the first inclined surface 21 is set as a point a and a lowest point is set as a point b, as shown in FIG. 3. Similarly, according to a thickness of the third connecting housing 3, a highest point of the second inclined surface 31 is set as a point c and a lowest point is set as a point d.

In this application, the first connecting housing 1, the second connecting housing 2, and the third connecting housing 3 are stacked together in sequence in a direction from the user's head to the outside. In a contracted state, the first connecting housing 1 and the second connecting housing 2 extend along the same straight line in opposite directions. In this case, the point a is closest to the point d, that is, the point a is close to the point d or directly coincides with the point d, and the point b is closest to the point c, that is, the point b is close to the point c or directly coincides with the point c. In an expanded state, the first connecting housing 1 and the second connecting housing 2 form an included angle. In this case, the point a is closest to the point c, that is, the point a is close to the point c or directly coincides with the point c, and the point b is closest to the point d, that is, the point b is close to the point d or directly coincides with the point d. It should be noted that in the contracted state, the second connecting housing 2 and the third connecting housing 3 in this application form a cylinder 42 after the two inclined surfaces are fitted together. That is to say, a circle center axis of the second connecting housing 2 coincides with a circle center axis of the third connecting housing 3.

Specifically, when the user wants to attach the earphone body 61 to the ear, the user merely needs to rotate the second connecting housing 2. During the rotation of the second connecting housing 2, the positioning member prevents the first inclined surface 21 and the second inclined surface 31 from deviating relative to each other, and the connecting member always presses the first inclined surface 21 against the second inclined surface 31, so that the point a can approach the point c, and the point b can approach the point d. That is to say, an end surface of the third connecting housing 3 facing away from the second connecting housing 2 forms a gradually increasing included angle with the circle center axis of the second connecting housing 2, thereby enabling the expanded state.

In this embodiment, when the user rotates the second connecting housing 2, a position of the third connecting housing 3 automatically changes, that is, the earphone body 61 is separated from rather than attached to the ear, which does not require the user to perform additional operations, thereby improving the operating comfort for the user.

Figure 4:
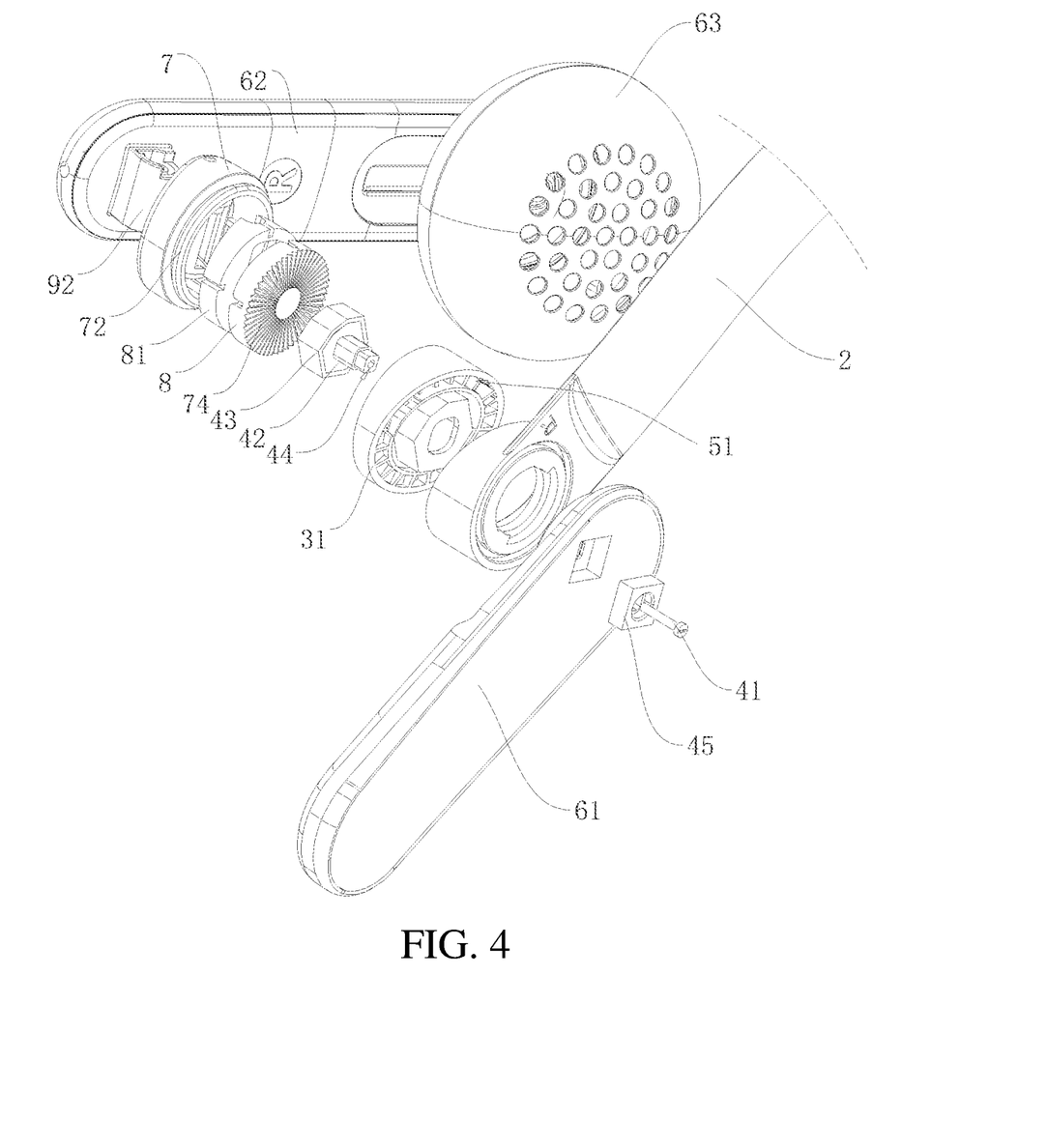
FIG. 4 is an exploded view of the device for expansion and contraction through rotation of a rotary shaft according to an embodiment of the present application from another perspective.

With reference to FIG. 3 and FIG. 4, in a specific embodiment, the connecting member includes a connecting post 4 and a screw 41.

The connecting post 4 includes a post body 42 and a protruding edge 43 fixedly arranged on an end of the post body 42.

A threaded hole 44 is arranged on a tail end of the post body 42, the threaded hole 44 extends in a length direction of the post body 42, and a gap is defined between the post body 42 and the second connecting housing 2.

The screw 41 is threadedly connected to the threaded hole 44, and is configured to press the protruding edge 43 against an outer side of the third connecting housing 3 after the post body 42 successively extends through the third connecting housing 3, the second connecting housing 2, and the first connecting housing 1.

In this embodiment, the mating between the post body 42 and the screw 41 can ensure the stability of the connection among the first connecting housing 1, the second connecting housing 2, and the third connecting housing 3. Therefore, when the second connecting housing 2 rotates relative to the first connecting housing 1 and the third connecting housing 3, the three connecting housings do not disconnect from each other, and the first inclined surface 21 and the second inclined surface 31 keep contact with each other.

In a specific embodiment, the post body 42 is a prism, the screw 41 is connected to the first connecting housing 1 through a square block 45, the square block 45 is embedded in the first connecting housing 1, an end of the prism is embedded in the square block 45, and the screw 41 extends through the square block 45 and is threadedly connected to the end of the prism embedded in the square block 45.

In this embodiment, in order to improve the stability of the connection among the first connecting housing 1, the second connecting housing 2, and the third connecting housing 3, the post body 42 is designed as a prism, and a hole matching the post body 42 is arranged on each of the first connecting housing 1 and the second connecting housing 2, so as to prevent the third connecting housing 3 from rotating during the rotation of the second connecting housing 2. In addition, the mating among the square block 45, the post body 42, and the screw 41 improves the stability of the first connecting housing 1 and the third connecting housing 3 relative to each other, so that the first connecting housing 1 and the third connecting housing 3 can be kept in a relatively fixed state, and are prevented from rotating with the second connecting housing 2.

Figure 5:
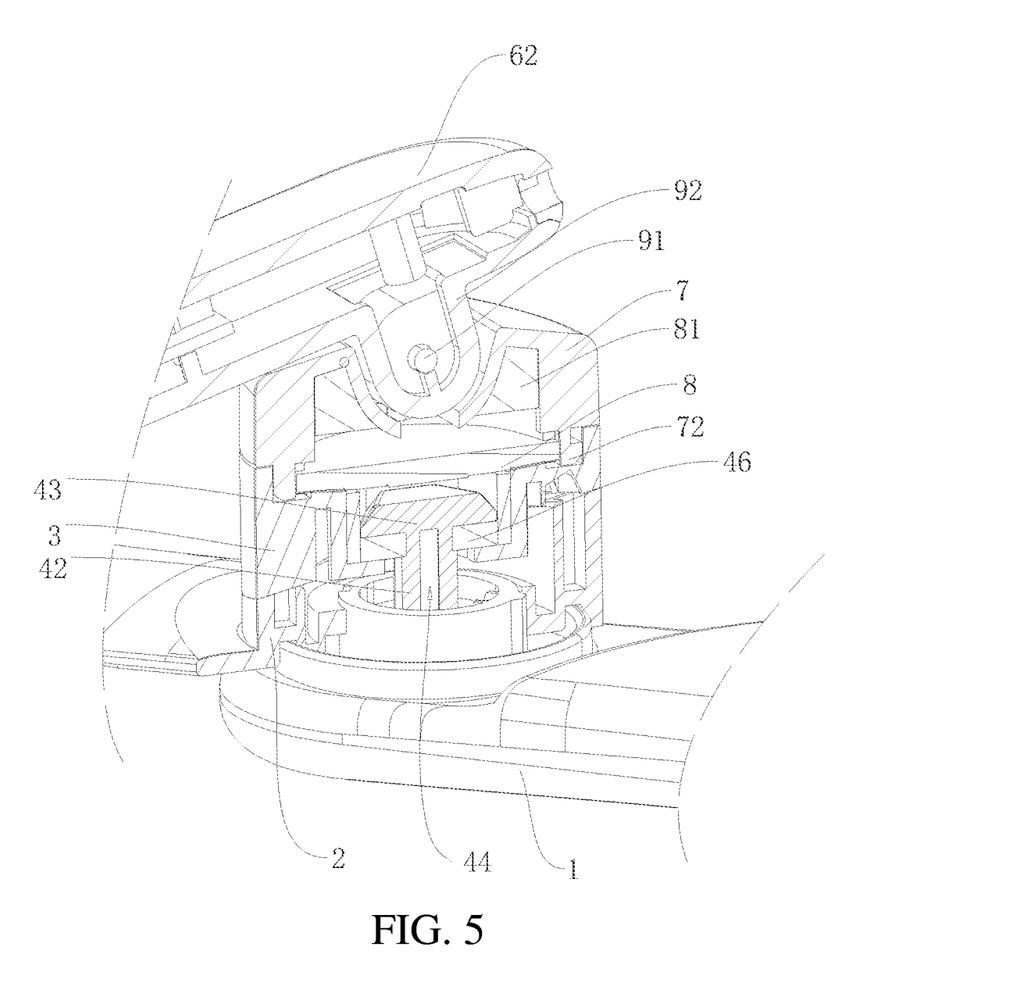
FIG. 5 is a cross-sectional view of the device for expansion and contraction through rotation of a rotary shaft according to an embodiment of the present application.

With reference to FIG. 4 and FIG. 5, in a specific embodiment, a buffer layer 46 is arranged between the protruding edge 43 and the third connecting housing 3.

In this embodiment, in order to reduce wear between the protruding edge 43 and the third connecting housing 3 so as to extend a service life of the third connecting housing 3, in this application, the buffer layer 46 is sleeved on an outer peripheral side of the post body 42 to provide buffering. During manufacturing, the buffer layer 46 may be made of a rubber or other elastic materials according to an actual need. Details are not described herein.

In a specific embodiment, a plurality of limiting grooves 51 are circumferentially arranged on the third connecting housing 3, the positioning member is a limiting block 5 arranged on the second connecting housing 2 and slidably connected to the limiting groove 51, a quantity of the limiting blocks 5 corresponds to a quantity of the limiting grooves 51, and a circle center of each of the limiting grooves 51 coincides with centers of rotation of the second connecting housing 2 and the third connecting housing 3.

In this embodiment, due to the gap between the post body 42 and the second connecting housing 2, the circle center axis of the second connecting housing 2 may deviate, which leads to a deviation between the first inclined surface 21 and the second inclined surface 31, and leads to a deviation of the position of the third connecting housing 3. In order to resolve the problem, the positioning member is designed in this application. The positioning member in this application is a limiting block 5 integrally formed on a side of the second connecting housing 2 facing away from the first connecting housing 1. Specifically, the limiting block 5 is fixedly arranged on an edge of the first inclined surface 21. During the rotation of the second connecting housing 2, the limiting block 5 is slidably connected to a corresponding limiting groove 51, thereby limiting the rotation of the second connecting housing 2 and the third connecting housing 3.

Referring back to FIG. 1 and FIG. 3, the embodiments of the present invention further provide a VR headset, including two devices for expansion and contraction through rotation of a rotary shaft described above, a VR glass body 6, and two earphone bodies 61. Two ends of the VR glass body 6 are respectively connected to an other end of the two first connecting housing 1, and other ends of the two second connecting housings 2, and the two earphone bodies 61 are respectively connected to the two third connecting housings 3.

Figure 6:
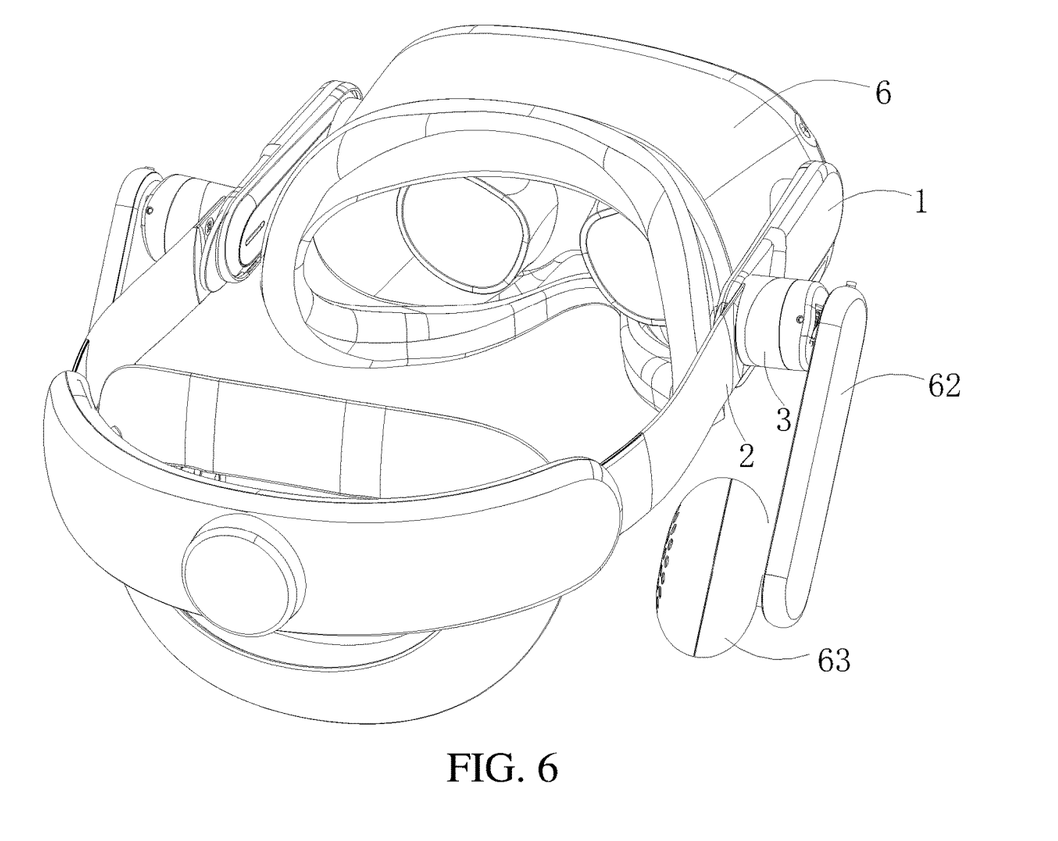
FIG. 6 is another schematic structural diagram of a VR headset according to an embodiment of the present application.

As shown in FIG. 6, in this embodiment, the VR glass body 6 is arranged between the two first connecting housings 1. After the user wear the VR headset, the two earphone bodies 61 are respectively attached to outer sides of the two ears of the user. When the user wants to remove the VR headset, the user directly rotates the second connecting housing 2 upward with hands, for example, rotates the second connecting housing to a state shown in FIG. 1. At this time, the central axes of the second connecting housing 2 and the third connecting housing 3 no longer coincide but form an included angle with each other, so that the earphone body 61 on the third housing automatically expand outward. That is to say, the earphone body 61 is no longer attached to the user's ears. In this way, actual operations are reduced for the user, that is, the operating comfort is improved for the user.

Figure 1:
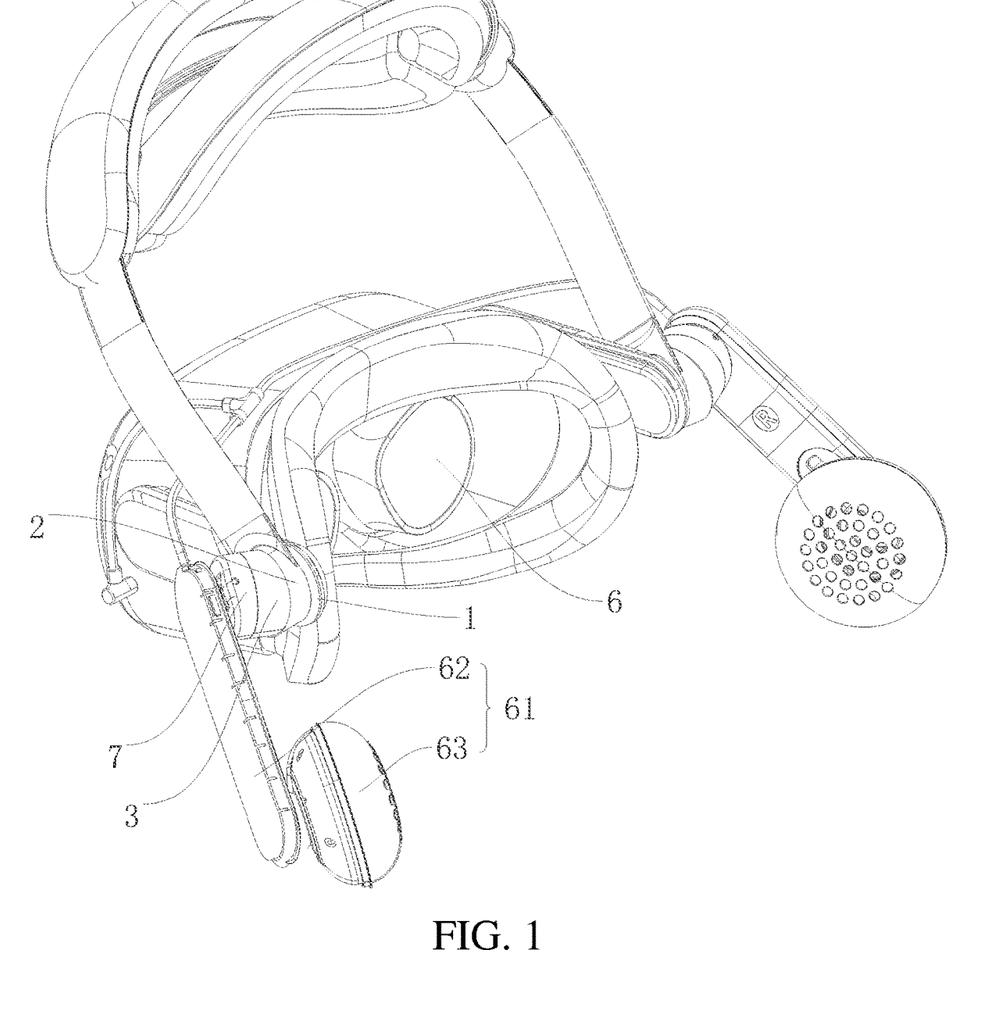
FIG. 1 is a schematic structural diagram of a VR headset according to an embodiment of the present application.
Figure 2:
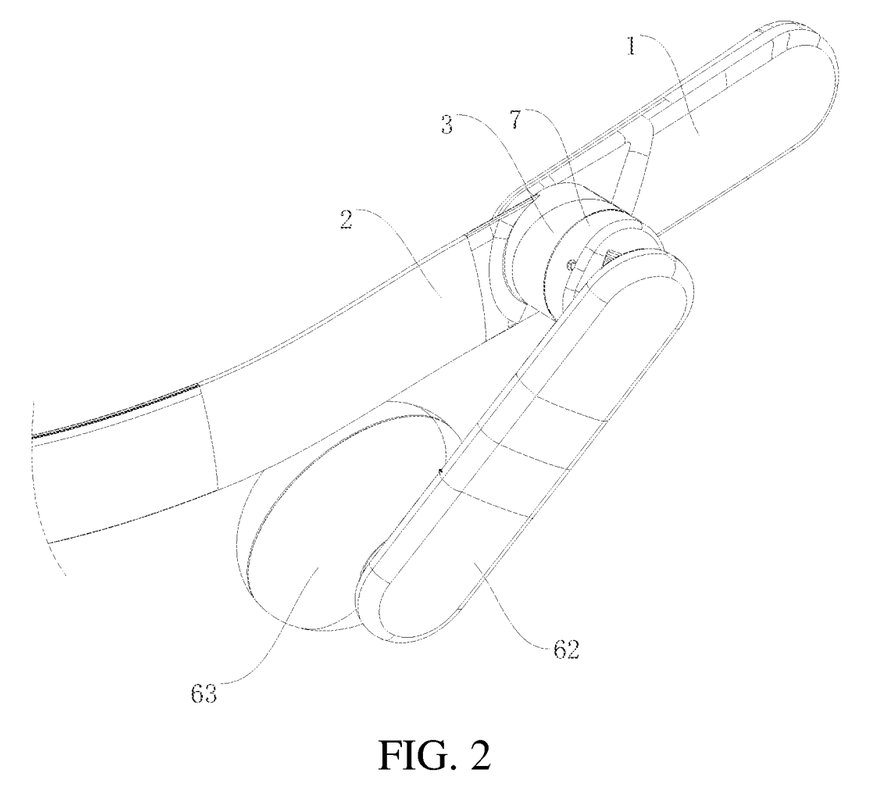
FIG. 2 is a schematic structural diagram of a device for expansion and contraction through rotation of a rotary shaft according to an embodiment of the present application.

Similarly, when the user wants to wear the VR headset, the user aligns the VR glass body 6 to eyes, and then rotates the second connecting housing 2 downward, for example, rotates the second connecting housing from the state shown in FIG. 1 to a state shown in FIG. 6, so that an end of the second connecting housing 2 facing away from the first connecting housing 1 abuts against a back of a head. At this time, the third connecting housing 3 drives the earphone body 61 to change from the expanded state to the contracted state until the earphone body 61 abuts against the ear.

In a specific embodiment, the earphone body 61 includes an engagement member 62 and a speaker 63, one end of the engagement member 62 is rotatably connected to the third connecting housing 3 through a rotary member, and an other end is fixedly connected to the speaker 63.

In this embodiment, the position of the earphone body 61 may be adjusted by using the rotary member for user groups of different ages, to improve the applicability and practicability of the VR headset in this application.

With reference to FIG. 3 and FIG. 4, in a specific embodiment, a mounting block 7 is arranged on the end of the engagement member 62, and the rotary member includes:

a first engagement portion 71, fixedly arranged on an inner side wall of the third connecting housing 3;

a second engagement portion 72, fixedly arranged on an outer peripheral side wall of the mounting block 7 and configured to be engaged with the first engagement portion 71;

a first wavy toothed section 73, arranged on a side of the third connecting housing 3 facing the mounting block 7; and a second wavy toothed section 74, arranged on the mounting block 7.

Peak lines of the first wavy toothed section 73 and the second wavy toothed section 74 both extend outward along a center of rotation of the third connecting housing 3, and the first wavy toothed section 73 is meshed with the second wavy toothed section 74 when the first engagement portion 71 is engaged with the second engagement portion 72.

In this embodiment, a receiving groove 32 is arranged on an end of the third connecting housing 3 facing away from the second connecting housing 2. The first engagement portion 71 is integrally formed on an inner side wall of the receiving groove 32, and the first wavy toothed section 73 is integrally formed on a bottom wall of the receiving groove 32. It should be noted that the mounting block 7 in this application is embedded in the receiving groove 32 during the mounting, so that the third connecting housing 3 can limit and position the mounting block 7. In this embodiment, two first engagement portions 71 are arranged, the second engagement portion 72 is arranged in the form of a ring, and an inclined guide surfaces is arranged on each of the first engagement portion 71 and the second engagement portion 72. Specifically, cross sections of the first engagement portion 71 and the second engagement portion 72 are designed as triangular. During the mounting, the mounting block 7 is embedded in the receiving groove 32. In this case, the inclined guide surface of the second engagement portion 72 and the inclined guide surface of the first engagement portion 71 contact and squeeze each other, so that the second engagement portion 72 and the first engagement portion 71 deform correspondingly until the mounting block 7 is engaged with the third connecting housing 3.

In this embodiment, the first wavy toothed section 73 includes a plurality of prisms with triangular cross sections. During actual operation, through elastic deformation between the first wavy toothed section 73 and the second wavy toothed section 74, when the mounting block 7 is rotated by a distance of one wavelength, a peak of the first wavy toothed section 73 enters an adjacent valley of the second wavy toothed section 74. That is to say, the first wavy toothed section 73 and the second wavy toothed section 74 can remain relatively fixed without an external force. Therefore, after the position of the earphone body 61 is adjusted, the earphone body 61 may not shake.

In a specific embodiment, the second wavy toothed section 74 is connected to the mounting block 7 through an engagement block 8, and the engagement block 8 is connected to the mounting block 7 through a buffer block 81.

In this embodiment, the second wavy toothed section 74 is integrally formed on a side of the engagement block 8 facing the third connecting housing 3, and the buffer block 81 is made of an elastic material to provide buffering.

In a specific embodiment, a mounting groove 75 is arranged on the mounting block 7, a reset torsion spring 9 and a rotary shaft 91 are arranged in the mounting groove 75, a rotation hole 64 configured for the rotary shaft 91 to extend through is arranged on the engagement member 62, the reset torsion spring 9 is arranged on the rotary shaft 91, one end of the reset torsion spring 9 is fixedly arranged on an inner wall of the mounting groove 75, and an other end is fixedly arranged on the engagement member 62, to reset the earphone body 61 from an open state to an attached state.

In this embodiment, two reset torsion springs 9 are arranged to improve the stability of connection between the mounting block 7 and the earphone body 61. An engagement post 92 protrudes from a side of the engagement member 62, the rotation hole 64 is arranged on the engagement post 92 and extends in a length direction of the engagement post 92. An avoidance groove 93 configured for the reset torsion spring 9 to be embedded is arranged on each of an upper end and a lower end of the engagement post 92. During the mounting, the two torsion springs are respectively embedded in the corresponding avoidance grooves 93, and then the engagement post 92 is embedded into the mounting groove 75. Finally, the rotary shaft 91 is inserted into the mounting groove 75 and the rotation hole 64 from a side of the mounting block 7, so as to connect the mounting block 7 to the engagement member 62.

In this embodiment, when the speaker 63 is attached to the user's ear, the reset torsion spring 9 is in a normal state. If the user applies an outward force to the engagement member 62 with hands, the reset torsion spring 9 is deformed. After the user releases the force, the reset torsion spring 9 drives the engagement member 62 toward the inner side, that is, drives the speaker 63 to be attached to the user's ear again.

The foregoing descriptions are merely a specific implementation of the present application, but are not intended to limit the protection scope of the present application. Any various equivalent modifications or replacements readily figured out by a person skilled in the art within the technical scope disclosed in the present application shall fall within the protection scope of the present application. Therefore, the protection scope of the present application shall be subject to the protection scope of the claims.

What is claimed is:

1. A device for expansion and contraction through rotation of a rotary shaft, comprising:
    a first connecting housing (1);
    a second connecting housing (2), wherein one end of the second connecting housing (2) is rotatably connected to one end of the first connecting housing (1), and a surface of the second connecting housing (2) facing away from the first connecting housing (1) is a first inclined surface (21);
    a third connecting housing (3), wherein the third connecting housing (3) is provided with a second inclined surface (31) configured to fit the first inclined surface (21);
    a connecting member, successively extending through the third connecting housing (3) and the second connecting housing (2) and connected to the first connecting housing (1), and configured to fix the first connecting housing (1), the second connecting housing (2), and the third connecting housing (3) and fit the first inclined surface (21) to the second inclined surface (31); and
    a positioning member, connected to the second connecting housing (2) or the third connecting housing (3) and configured to control the second connecting housing (2) and the third connecting housing (3) to avoid deviation when the second connecting housing and the third connecting housing rotate relative to each other, wherein
    a gap is defined between the connecting member and the second connecting housing (2).

2. The device for expansion and contraction through rotation of a rotary shaft according to claim 1, wherein the connecting member comprises a connecting post (4) and a screw (41);
    the connecting post (4) comprises a post body (42) and a protruding edge (43) fixedly arranged on an end of the post body (42);
    a threaded hole (44) is arranged on a tail end of the post body (42), the threaded hole (44) extends in a length direction of the post body (42), and a gap is defined between the post body (42) and the second connecting housing (2); and
    the screw (41) is threadedly connected to the threaded hole (44), and is configured to press the protruding edge (43) against an outer side of the third connecting housing (3) after the post body (42) successively extends through the third connecting housing (3), the second connecting housing (2), and the first connecting housing (1).

3. The device for expansion and contraction through rotation of a rotary shaft according to claim 2, wherein the post body (42) is a prism, the screw (41) is connected to the first connecting housing (1) through a square block (45), the square block (45) is embedded in the first connecting housing (1), an end of the prism is embedded in the square block (45), and the screw (41) extends through the square block (45) and is threadedly connected to the end of the prism embedded in the square block (45).

4. The device for expansion and contraction through rotation of a rotary shaft according to claim 2, wherein a buffer layer (46) is arranged between the protruding edge (43) and the third connecting housing (3).

5. The device for expansion and contraction through rotation of a rotary shaft according to claim 1, wherein a plurality of limiting grooves (51) are circumferentially arranged on the third connecting housing (3), the positioning member is a limiting block (5) arranged on the second connecting housing (2) and slidably connected to the limiting groove (51), a quantity of the limiting blocks (5) corresponds to a quantity of the limiting grooves (51), and a circle center of each of the limiting grooves (51) coincides with centers of rotation of the second connecting housing (2) and the third connecting housing (3).

6. A VR headset, comprising two devices for expansion and contraction through rotation of a rotary shaft according to claim 1, a VR glass body (6), and two earphone bodies (61), wherein two ends of the VR glass body (6) are respectively connected to other ends of the two first connecting housings (1) and other ends of the two second connecting housings (2), and the two earphone bodies (61) are respectively connected to the two third connecting housings (3).

7. The VR headset according to claim 6, wherein the earphone body (61) comprises an engagement member (62)

and a speaker (63), one end of the engagement member (62) is rotatably connected to the third connecting housing (3) through a rotary member, and an other end is fixedly connected to the speaker (63).

8. The VR headset according to claim 7, wherein a mounting block (7) is arranged on the end of the engagement member (62), and the rotary member comprises:
a first engagement portion (71), fixedly arranged on an inner side wall of the third connecting housing (3);
a second engagement portion (72), fixedly arranged on an outer peripheral side wall of the mounting block (7) and configured to be engaged with the first engagement portion (71);
a first wavy toothed section (73), arranged on a side of the third connecting housing (3) facing the mounting block (7); and
a second wavy toothed section (74), arranged on the mounting block (7), wherein
peak lines of the first wavy toothed section (73) and the second wavy toothed section (74) both extend outward along a center of rotation of the third connecting housing (3), and the first wavy toothed section (73) is meshed with the second wavy toothed section (74) when the first engagement portion (71) is engaged with the second engagement portion (72).

9. The VR headset according to claim 8, wherein the second wavy toothed section (74) is connected to the mounting block (7) through an engagement block (8), and the engagement block (8) is connected to the mounting block (7) through a buffer block (81).

10. The VR headset according to claim 8, wherein a mounting groove (75) is arranged on the mounting block (7), a reset torsion spring (9) and a rotary shaft (91) are arranged in the mounting groove (75), a rotation hole (64) configured for the rotary shaft (91) to extend through is arranged on the engagement member (62), the reset torsion spring (9) is sleeved on the rotary shaft (91), one end of the reset torsion spring (9) is fixedly arranged on an inner wall of the mounting groove (75), and an other end is fixedly arranged on the engagement member (62), to reset the earphone body (61) from an open state to an attached state.

11. The VR headset according to claim 6, wherein the connecting member comprises a connecting post (4) and a screw (41);
the connecting post (4) comprises a post body (42) and a protruding edge (43) fixedly arranged on an end of the post body (42);
a threaded hole (44) is arranged on a tail end of the post body (42), the threaded hole (44) extends in a length direction of the post body (42), and a gap is defined between the post body (42) and the second connecting housing (2); and
the screw (41) is threadedly connected to the threaded hole (44), and is configured to press the protruding edge (43) against an outer side of the third connecting housing (3) after the post body (42) successively extends through the third connecting housing (3), the second connecting housing (2), and the first connecting housing (1).

12. The VR headset according to claim 11, wherein the post body (42) is a prism, the screw (41) is connected to the first connecting housing (1) through a square block (45), the square block (45) is embedded in the first connecting housing (1), an end of the prism is embedded in the square block (45), and the screw (41) extends through the square block (45) and is threadedly connected to the end of the prism embedded in the square block (45).

13. The VR headset according to claim 11, wherein a buffer layer (46) is arranged between the protruding edge (43) and the third connecting housing (3).

14. The VR headset according to claim 6, wherein a plurality of limiting grooves (51) are circumferentially arranged on the third connecting housing (3), the positioning member is a limiting block (5) arranged on the second connecting housing (2) and slidably connected to the limiting groove (51), a quantity of the limiting blocks (5) corresponds to a quantity of the limiting grooves (51), and a circle center of each of the limiting grooves (51) coincides with centers of rotation of the second connecting housing (2) and the third connecting housing (3).

* * * * *